(12) United States Patent
Fellows et al.

(10) Patent No.: US 12,020,291 B2
(45) Date of Patent: *Jun. 25, 2024

(54) SYSTEMS AND METHODS FOR ADMINISTERING AN ONLINE ADVERTISER BIDDING INTERFACE

(71) Applicant: Yahoo Ad Tech LLC, Dulles, VA (US)

(72) Inventors: James Fellows, Baltimore, MD (US); Brent Halliburton, Columbia, MD (US); Eric Bosco, Washington, DC (US)

(73) Assignee: Yahoo Ad Tech LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,906

(22) Filed: Jun. 3, 2022

(65) Prior Publication Data
US 2022/0301016 A1 Sep. 22, 2022

Related U.S. Application Data

(63) Continuation of application No. 12/565,187, filed on Sep. 23, 2009, now Pat. No. 11,379,880.

(60) Provisional application No. 61/099,483, filed on Sep. 23, 2008.

(51) Int. Cl.
*G06Q 30/00* (2023.01)
*G06Q 30/0273* (2023.01)
*G05B 19/418* (2006.01)

(52) U.S. Cl.
CPC .............................. *G06Q 30/0275* (2013.01)

(58) Field of Classification Search
CPC .................................................. G06Q 30/0275
See application file for complete search history.

(56) References Cited

U.S. PATENT DOCUMENTS

| 9,053,492 | B1 * | 6/2015 | Stanley ............ G06Q 30/0224 |
| 2002/0073119 | A1 | 6/2002 | Richard |
| 2006/0212350 | A1 * | 9/2006 | Ellis ................. G06Q 30/0254 |
| | | | 705/14.66 |
| 2007/0005421 | A1 | 1/2007 | Labio |
| 2007/0143186 | A1 | 6/2007 | Apple et al. |

(Continued)

OTHER PUBLICATIONS

"A framework for targeting banner advertising on the Internet". IEEE. 1997. (Year: 1997).*

(Continued)

*Primary Examiner* — Maria V Vanderhorst
(74) *Attorney, Agent, or Firm* — Bookoff McAndrews, PLLC

(57) ABSTRACT

A computer-implemented method is provided for administering an online advertiser bidding interface. The method includes providing a bidding interface to an advertiser through a web server, by which an advertiser may bid on online advertising inventory of an online publisher, the bidding interface displaying a plurality of targeting elements; receiving targeting information from the advertiser through the targeting elements of the bidding interface and the web server; and generating an advertising bid based on the received targeting information. A system is also provided for administering an online advertiser bidding interface.

20 Claims, 18 Drawing Sheets

(56) References Cited

U.S. PATENT DOCUMENTS

| | | |
|---|---|---|
| 2007/0162342 A1 | 7/2007 | Klopf |
| 2007/0265923 A1 | 11/2007 | Krassner |
| 2007/0271145 A1 | 11/2007 | Vest |
| 2008/0010120 A1 | 1/2008 | Chung et al. |
| 2008/0275753 A1 | 11/2008 | Protheroe |
| 2008/0294524 A1 | 11/2008 | Badros |

OTHER PUBLICATIONS

"Toward Expressive and Scalable Sponsored Search Auctions". IEEE. 2008. (Year: 2008).*

"Online Advertisement Campaign Optimization". IEEE. 2007 (Year: 2007).

* cited by examiner

SET UP CAMPAIGN | TARGET + BID | SET BUDGET | ADD BANNERS | CREATE ACCOUNT | REVIEW + LAUNCH — 204

TARGET AND BID

| AVAILABLE DAILY IMPRESSIONS: | MINIMUM BID: $1.00 |
|---|---|
| 1,585,748,569 | SUGGESTED BID: $1.10 - 1.20 |

— 514

TARGET BY GEOGRAPHY
CHOOSE THE GEOGRAPHICAL AREA WHERE YOUR AD SHOULD BE DISPLAYED.
- ◉ DISPLAY ADS TO THE ENTIRE COUNTRY
- ○ DISPLAY ADS ONLY TO SPECIFIC STATES/PROVINCES
- ○ DISPLAY ADS ONLY TO SPECIFIC CITIES/DMAS

— 502

DID YOU KNOW?
MORE SPECIFIC TARGETING MAY IMPROVE THE EFFICIENCY OF YOUR MARKETING ACTIVITY, BUT LIMITS YOUR AVAILABLE AUDIENCE AND INCREASES THE MINIMUM REQUIRED BID.

TARGET BY TYPE OF SITE
CHOOSE THE TYPES OF SITES WHERE YOU WANT YOUR ADS TO BE SHOWN.
- ◉ ALL TYPES OF SITES
- ○ SPECIFIC TYPES OF SITES ACROSS THE WEB
- ○ SPECIFIC SECTIONS OF AOL.COM AND OTHER AOL PROPERTIES

— 504

REPRESENTATIVE SITES
NETWORK MEMBERS CAN VIEW A LIST OF REPRESENTATIVE SITES WHERE A CAMPAIGN WOULD BE DISPLAYED. CREATE AN ACCOUNT OR LOGIN TO VIEW THE SITE LIST.

TARGET BY AUDIENCE
WHAT TYPES OF WEB VISITORS DO YOU WANT TO TARGET?
- ◉ ALL TYPES OF VISITORS
- ○ VISITORS WITH A SPECIFIC DEMOGRAPHIC ATTRIBUTE
- ○ VISITORS WITH A SPECIFIC INTEREST

— 506

SET YOUR MAXIMUM BID
MINIMUM BID: $1.00       SUGGESTED BID: $1.10 - $1.20 — 510       $ [1.00] PER THOUSAND IMPRESSIONS — 512

ENTER YOUR MAXIMUM BID*
[NEXT]

SET UP CAMPAIGN | TARGET + BID | SET BUDGET | ADD BANNERS | CREATE ACCOUNT | REVIEW + LAUNCH

TARGET AND BID

TARGET BY GEOGRAPHY
CHOOSE THE GEOGRAPHICAL AREA WHERE YOUR AD SHOULD BE DISPLAYED.
○ DISPLAY ADS TO THE ENTIRE COUNTRY
● DISPLAY ADS ONLY TO SPECIFIC STATES/PROVINCES

| AVAILABLE STATES | | SELECTED STATES |
|---|---|---|
| ALABAMA<br>ALASKA<br>ARIZONA<br>ARKANSAS<br>COLORADO<br>CONNECTICUT<br>DELAWARE<br>DISTRICT OF COLUMBIA | » «  | CALIFORNIA |

602

○ DISPLAY ADS ONLY TO SPECIFIC CITIES/DMAS

TARGET BY TYPE OF SITE
CHOOSE THE TYPES OF SITES WHERE YOU WANT YOUR ADS TO BE SHOWN.
● ALL TYPES OF SITES
○ SPECIFIC TYPES OF SITES ACROSS THE WEB
○ SPECIFIC SECTIONS OF AD NETWORK PROPERTIES

TARGET BY AUDIENCE
WHAT TYPES OF WEB VISITORS DO YOU WANT TO TARGET?
● ALL TYPES OF VISITORS
○ VISITORS WITH A SPECIFIC DEMOGRAPHIC ATTRIBUTE
○ VISITORS WITH A SPECIFIC INTEREST

SET YOUR MAXIMUM BID
MINIMUM BID: SUGGESTED BID:
$1.50       $1.65 - $1.80

ENTER YOUR MAXIMUM BID*   $ [1.50]   PER THOUSAND IMPRESSIONS

[NEXT]

---

AVAILABLE DAILY IMPRESSIONS:
201,865,793

MINIMUM BID: $1.50
SUGGESTED BID:
$1.65 - $1.80

DID YOU KNOW?
MORE SPECIFIC TARGETING MAY IMPROVE THE EFFICIENCY OF YOUR MARKETING ACTIVITY, BUT LIMITS YOUR AVAILABLE AUDIENCE AND INCREASES THE MINIMUM REQUIRED BID.

REPRESENTATIVE SITES
NETWORK MEMBERS CAN VIEW A LIST OF REPRESENTATIVE SITES WHERE A CAMPAIGN WOULD BE DISPLAYED. CREATE AN ACCOUNT OR LOGIN TO VIEW THE SITE LIST.

| SET UP CAMPAIGN | TARGET | TARGET + BID | SET BUDGET | ADD BANNERS | CREATE ACCOUNT | REVIEW + LAUNCH |

TARGET AND BID

| | AVAILABLE DAILY IMPRESSIONS: 179,128,854 | MINIMUM BID: $2.00 SUGGESTED BID: $2.20 - $2.40 |
|---|---|---|

TARGET BY GEOGRAPHY
CHOOSE THE GEOGRAPHICAL AREA WHERE YOUR AD SHOULD BE DISPLAYED.
○ DISPLAY ADS TO THE ENTIRE COUNTRY
○ DISPLAY ADS ONLY TO SPECIFIC STATES/PROVINCES
● DISPLAY ADS ONLY TO SPECIFIC CITIES/DMAS

DID YOU KNOW?
MORE SPECIFIC TARGETING MAY IMPROVE THE EFFICIENCY OF YOUR MARKETING ACTIVITY, BUT LIMITS YOUR AVAILABLE AUDIENCE AND INCREASES THE MINIMUM REQUIRED BID.

| AVAILABLE DMAS | | SELECTED DMAS |
|---|---|---|
| AK-ANCHORAGE<br>AL-BIRMINGHAM<br>AL-MOBILE/PENSACOLA FL<br>AL-HUNTSVILLE<br>AR-LITTLE ROCK/PINE BLUFF<br>AZ-TUCSON<br>AZ-PHOENIX<br>CA-FREZNO | ≫<br>≪ | CA-LOS ANGELES |

702

TARGET BY TYPE OF SITE
CHOOSE THE TYPES OF SITES WHERE YOU WANT YOUR ADS TO BE SHOWN.
● ALL TYPES OF SITES
○ SPECIFIC TYPES OF SITES ACROSS THE WEB
○ SPECIFIC SECTIONS OF AD NETWORK PROPERTIES

REPRESENTATIVE SITES
NETWORK MEMBERS CAN VIEW A LIST OF REPRESENTATIVE SITES WHERE A CAMPAIGN WOULD BE DISPLAYED. CREATE AN ACCOUNT OR LOGIN TO VIEW THE SITE LIST.

TARGET BY AUDIENCE
WHAT TYPES OF WEB VISITORS DO YOU WANT TO TARGET?
● ALL TYPES OF VISITORS
○ VISITORS WITH A SPECIFIC DEMOGRAPHIC ATTRIBUTE
○ VISITORS WITH A SPECIFIC INTEREST

SET YOUR MAXIMUM BID
MINIMUM BID: $2.00    SUGGESTED BID: $2.20 - $2.40

ENTER YOUR MAXIMUM BID*  $ [2.00] PER THOUSAND IMPRESSIONS

[NEXT]

| SET UP CAMPAIGN | TARGET + BID | SET BUDGET | ADD BANNERS | CREATE ACCOUNT | REVIEW + LAUNCH |

TARGET AND BID

| | AVAILABLE DAILY IMPRESSIONS: | MINIMUM BID: $4.50 |
|---|---|---|
| | 27,160,983 | SUGGESTED BID: $4.95 - $5.40 |

TARGET BY GEOGRAPHY
CHOOSE THE GEOGRAPHICAL AREA WHERE YOUR AD SHOULD BE DISPLAYED.
- ● DISPLAY ADS TO THE ENTIRE COUNTRY
- ○ DISPLAY ADS ONLY TO SPECIFIC STATES/PROVINCES
- ○ DISPLAY ADS ONLY TO SPECIFIC CITIES/DMAS

DID YOU KNOW?
MORE SPECIFIC TARGETING MAY IMPROVE THE EFFICIENCY OF YOUR MARKETING ACTIVITY, BUT LIMITS YOUR AVAILABLE AUDIENCE AND INCREASES THE MINIMUM REQUIRED BID.

TARGET BY TYPE OF SITE
CHOOSE THE TYPES OF SITES WHERE YOU WANT YOUR ADS TO BE SHOWN.
- ○ ALL TYPES OF SITES
- ● SPECIFIC TYPES OF SITES ACROSS THE WEB

SELECT ONE
- ○ AUTOMOTIVE
- ○ BUSINESS
- ○ CASUAL GAMING
- ○ EDUCATION
- ○ EMAIL
- ○ ENTERTAINMENT
- ○ FOOD
- ○ FUN LOVING
- ○ HEALTH
- ○ HISPANIC
- ○ LIFESTYLE
- ○ MEN
- ○ MOVIES
- ○ MUSIC
- ○ NEWS
- ○ PARENTING
- ○ PERSONAL FINANCE
- ○ REAL ESTATE
- ○ SOCIAL NETWORKING
- ○ SPORTS
- ○ TECHNOLOGY
- ○ TEENS
- ○ TRAVEL
- ○ TV
- ○ VIDEO GAMES
- ○ WEATHER
- ○ WOMEN

REPRESENTATIVE SITES
NETWORK MEMBERS CAN VIEW A LIST OF REPRESENTATIVE SITES WHERE A CAMPAIGN WOULD BE DISPLAYED. CREATE AND ACCOUNT OR LOGIN TO VIEW THE SITE LIST.

— 802

- ○ SPECIFIC SECTIONS OF AD NETWORK PROPERTIES

TARGET BY AUDIENCE
WHAT TYPES OF WEB VISITORS DO YOU WANT TO TARGET?
- ● ALL TYPES OF VISITORS
- ○ VISITORS WITH A SPECIFIC DEMOGRAPHIC ATTRIBUTE
- ○ VISITORS WITH A SPECIFIC INTEREST

SET YOUR MAXIMUM BID
MINIMUM BID: $4.50    SUGGESTED BID: $4.95 - $5.40

ENTER YOUR MAXIMUM BID*  $ [4.50] PER THOUSAND IMPRESSIONS

[NEXT]

FIG. 9

| SET UP CAMPAIGN | TARGET + BID | SET BUDGET | ADD BANNERS | CREATE ACCOUNT | REVIEW + LAUNCH |

TARGET AND BID

| | AVAILABLE DAILY IMPRESSIONS: | MINIMUM BID: $1.00 |
| | 1,585,748,569 | SUGGESTED BID: $1.10 - $1.20 |

TARGET BY GEOGRAPHY
CHOOSE THE GEOGRAPHICAL AREA WHERE YOUR AD SHOULD BE DISPLAYED.
- ⦿ DISPLAY ADS TO THE ENTIRE COUNTRY
- ○ DISPLAY ADS ONLY TO SPECIFIC STATES/PROVINCES
- ○ DISPLAY ADS ONLY TO SPECIFIC CITIES/DMAS

DID YOU KNOW?
MORE SPECIFIC TARGETING MAY IMPROVE THE EFFICIENCY OF YOUR MARKETING ACTIVITY, BUT LIMITS YOUR AVAILABLE AUDIENCE AND INCREASES THE MINIMUM REQUIRED BID.

TARGET BY TYPE OF SITE
CHOOSE THE TYPES OF SITES WHERE YOU WANT YOUR ADS TO BE SHOWN.
- ○ ALL TYPES OF SITES
- ○ SPECIFIC TYPES OF SITES ACROSS THE WEB
- ⦿ SPECIFIC SECTIONS OF AD NETWORK PROPERTIES

BECAUSE OUR SECTIONS ALLOW YOU TO PICK A SPECIFIC PLACEMENT, THERE IS NOT A LIST OF REPRESENTATIVE SITES FOR THESE OPTIONS.

SELECT ONE — 902
- ○ AOL-18-34
- ○ AOL-AGE 35 PLUS
- ○ AOL- FEMALE
- ○ AOL- MALE
- ○ AOL AUTOS
- ○ AOL BLACK VOICES
- ○ AOL CITY GUIDE
- ○ AOL EMAIL
- ○ AOL ENTERTAINMENT (NO TMZ)
- ○ AOL ENTERTAINMENT AND TMZ
- ○ AOL FINANCE
- ○ AOL HEALTH
- ○ AOL LATINO
- ○ AOL NEWS
- ○ AOL SPORTS
- ○ AOL TECHNOLOGY
- ○ AOL TRAVEL
- ○ AOL.COM (RUN OF SITE)
- ○ BEBO.COM
- ○ LEMON DROP
- ○ USERPLANE

TARGET BY AUDIENCE
WHAT TYPES OF WEB VISITORS DO YOU WANT TO TARGET?
- ⦿ ALL TYPES OF VISITORS
- ○ VISITORS WITH A SPECIFIC DEMOGRAPHIC ATTRIBUTE
- ○ VISITORS WITH A SPECIFIC INTEREST

SET YOUR MAXIMUM BID
MINIMUM BID: $1.00    SUGGESTED BID: $1.10 - $1.20

ENTER YOUR MAXIMUM BID* $ [2.00] PER THOUSAND IMPRESSIONS

[NEXT]

| SET UP CAMPAIGN | TARGET + BID | SET BUDGET | ADD BANNERS | CREATE ACCOUNT | REVIEW + LAUNCH |

TARGET AND BID

| AVAILABLE DAILY IMPRESSIONS: | MINIMUM BID: $1.00 |
|---|---|
| 1,585,748,569 | SUGGESTED BID: $1.10 - $1.20 |

TARGET BY GEOGRAPHY
CHOOSE THE GEOGRAPHICAL AREA WHERE YOUR AD SHOULD BE DISPLAYED.
- ⊙ DISPLAY ADS TO THE ENTIRE COUNTRY
- ○ DISPLAY ADS ONLY TO SPECIFIC STATES/PROVINCES
- ○ DISPLAY ADS ONLY TO SPECIFIC CITIES/DMAS

DID YOU KNOW?
MORE SPECIFIC TARGETING MAY IMPROVE THE EFFICIENCY OF YOUR MARKETING ACTIVITY, BUT LIMITS YOUR AVAILABLE AUDIENCE AND INCREASES THE MINIMUM REQUIRED BID.

TARGET BY TYPE OF SITE
CHOOSE THE TYPES OF SITES WHERE YOU WANT YOUR ADS TO BE SHOWN.
- ⊙ ALL TYPES OF SITES
- ○ SPECIFIC TYPES OF SITES ACROSS THE WEB
- ○ SPECIFIC SECTIONS OF AD NETWORK PROPERTIES

REPRESENTATIVE SITES
BECAUSE OUR NETWORK CHANGES EVERY DAY, WE CANNOT GUARANTEE PLACEMENT ON ANY SPECIFIC SITE.

TARGET BY AUDIENCE
WHAT TYPES OF WEB VISITORS DO YOU WANT TO TARGET?
- ○ ALL TYPES OF VISITORS
- ⊙ VISITORS WITH A SPECIFIC DEMOGRAPHIC ATTRIBUTE

GENDER
  ⊙ BOTH MALE AND FEMALE   ○ ONLY MALE   ○ ONLY FEMALE

AGE
  ⊙ TARGET ALL AGES     ○ 18-24   ○ TARGET ONLY CERTAIN AGES
                        ○ 25-34   ○ 35-44   ○ 55-64
                                  ○ 45-54   ○ 65+

- ○ VISITORS WITH A SPECIFIC INTEREST

— 1002

SET YOUR MAXIMUM BID
MINIMUM BID:        SUGGESTED BID:
$1.00               $1.10 - $1.20

ENTER YOUR MAXIMUM BID*  $ [2.00]  PER THOUSAND IMPRESSIONS

[NEXT]

*FIG. 10*

SET UP CAMPAIGN | TARGET + BID | SET BUDGET | ADD BANNERS | CREATE ACCOUNT | REVIEW + LAUNCH

TARGET AND BID

AVAILABLE DAILY IMPRESSIONS: 1,585,748,569

MINIMUM BID: $1.00
SUGGESTED BID: $1.10 - $1.20

TARGET BY GEOGRAPHY
CHOOSE THE GEOGRAPHICAL AREA WHERE YOUR AD SHOULD BE DISPLAYED.
- ⦿ DISPLAY ADS TO THE ENTIRE COUNTRY
- ○ DISPLAY ADS ONLY TO SPECIFIC STATES/PROVINCES
- ○ DISPLAY ADS ONLY TO SPECIFIC CITIES/DMAS

DID YOU KNOW?
MORE SPECIFIC TARGETING MAY IMPROVE THE EFFICIENCY OF YOUR MARKETING ACTIVITY, BUT LIMITS YOUR AVAILABLE AUDIENCE AND INCREASES THE MINIMUM REQUIRED BID.

TARGET BY TYPE OF SITE
CHOOSE THE TYPES OF SITES WHERE YOU WANT YOUR ADS TO BE SHOWN.
- ⦿ ALL TYPES OF SITES
- ○ SPECIFIC TYPES OF SITES ACROSS THE WEB
- ○ SPECIFIC SECTIONS OF AOL.COM AND OTHER AOL PROPERTIES

REPRESENTATIVE SITES
NETWORK MEMBERS CAN VIEW A LIST OF REPRESENTATIVE SITES WHERE A CAMPAIGN WOULD BE DISPLAYED. CREATE AN ACCOUNT OR LOGIN TO VIEW THE SITE LIST.

TARGET BY AUDIENCE
WHAT TYPES OF WEB VISITORS DO YOU WANT TO TARGET?
- ○ ALL TYPES OF VISITORS
- ○ VISITORS WITH A SPECIFIC DEMOGRAPHIC ATTRIBUTE
- ⦿ VISITORS WITH A SPECIFIC INTEREST ─ 1102

SELECT ONE
- ○ AUTO
- ○ BLACK VOICES
- ○ COOKING
- ○ DIET & FITNESS
- ○ ENTERTAINMENT
- ○ GAMES
- ○ HOME
- ○ MOBILE
- ○ MONEY
- ○ MOVIES
- ○ MUSIC
- ○ PARENTING
- ○ REAL ESTATE
- ○ SHOPPING
- ○ SMALL BUSINESS
- ○ SPORTS
- ○ TECHNOLOGY
- ○ TELEVISION
- ○ TRAVEL
- ○ WOMEN

SET YOUR MAXIMUM BID
MINIMUM BID: $1.00
SUGGESTED BID: $1.10 - $1.20

ENTER YOUR MAXIMUM BID* $ [2.00] PER THOUSAND IMPRESSIONS

[NEXT]

SET UP CAMPAIGN | TARGET + BID | SET BUDGET | ADD BANNERS | CREATE ACCOUNT | REVIEW + LAUNCH

| AVAILABLE DAILY IMPRESSIONS: | YOUR BID: |
|---|---|
| 1,585,748,569 | $1.00 |

SET BUDGET

SET YOU MAXIMUM DAILY BUDGET

ENTER YOU TARGET DAILY BUDGET. WE OFFER A BUDGET GUARANTEE - YOU WILL NEVER BE CHARGED MORE THAN YOUR DAILY BUDGET, EVEN IF WE DELIVER MORE IMPRESSIONS OR CLICKS THAN BUDGETED.

ENTER YOUR DAILY BUDGET*  [$750] PER DAY ~1202
DAILY MINIMUM:$10

DID YOU KNOW?
WE WILL ONLY CHARGE YOU FOR YOUR SPEND AS YOU ACCUMULATE IT, AND YOU CAN CHANGE YOUR DAILY BUGET AT ANY TIME.

[NEXT]

ADD BANNERS
ADD BANNERS ADS TO YOUR CAMPAIGN

SET UP CAMPAIGN | TARGET + BID | SET BUDGET | ADD BANNERS | CREATE ACCOUNT | REVIEW + LAUNCH

UPLOAD A FILE — NEW! BUILD YOUR OWN BANNER | USE A THIRD-PARTY TAG

BANNER SIZE *: 728X90 ▾

UPLOAD BANNER *: DESKTOP/BANNER/  BROWSE...
ACCEPTABLE FORMATS: GIF OR JPG(50K MAX)

NAME THIS BANNER *: NVG BANNER
MAX 20 CHARACTERS

CLICK-THROUGH URL *: HTTP:// ▾ WWW.NVG-INC.COM
MAX 255 CHARACTERS

UPLOAD AND SAVE

| BANNER NAME | DIMENSIONS | |
|---|---|---|
| NVG BANNER | 728X90 | DELETE |

YOU SHOULD KNOW

Every campaign must include at least one 728x90 banner.

The more sizes uploaded, the more impressions a campaign is eligible to receive.

Please make sure there is a border on every banner. A border can be created either by a contrast in color from white or by a frame.

See our Ad Banner Guidelines for details.

NEXT

FIG. 15

| SET UP CAMPAIGN | TARGET + BID | SET BUDGET | ADD BANNERS | CREATE ACCOUNT | REVIEW + LAUNCH |

CREATE ACCOUNT

ACCOUNT INFORMATION

PLEASE ENTER YOUR ACCOUNT AND BILLING INFO BELOW.
WE WILL CHARGE A ONE-TIME FEE OF $5 TO CREATE YOUR ACCOUNT. IF YOU CREATE ADDITIONAL CAMPAIGNS IN THE FUTURE UNDER THIS ACCOUNT, YOU WILL NOT NEED TO PAY THIS FEE AGAIN. THIS AMOUNT IS NON-REFUNDABLE ONCE YOU COMPLETE YOUR ORDER.

| | | |
|---|---|---|
| EMAIL ADDRESS * | PKOSZTOLNIK@NVG-INC.COM | DID YOU KNOW? |
| PASSWORD * | ●●●●●●●● MUST BE 8-15 CHARACTERS LONG | THIS IS THE EMAIL ADDRESS AND PASSWORD THAT YOU WILL USE TO LOG IN TO CHECK YOUR CAMPAIGN STATS, ACCESS |
| CONFIRM PASSWORD * | ●●●●●●●● MUST BE 8-15 CHARACTERS LONG | CUSTOMER SERVICE, AND CREATE NEW CAMPAIGNS IN THE FUTURE. |

PERSONAL INFORMATION

| | |
|---|---|
| FIRST NAME * | PETER |
| LAST NAME * | KOSZTOLNIK |
| COMPANY NAME * | NVG |
| BUSINESS URL * | HTTP://WWW.NVG-INC.COM     E.G. HTTP://WWW.MYWEBSITE.COM |
| PHONE NUMBER | 1* E.G. 333-222-1111 |
| INDUSTRY TYPE * | BUSINESS MARKETING |
| COUNTRY * | UNITED STEATES |

| | |
|---|---|
| ADDRESS * | 3251 OLD LEE HWY |
| ADDRESS LINE 2 | SUITE 204 |
| CITY/TOWN * | FAIRFAX |
| STATE/PROVINCE/REGION * | VA |
| ZIP/POSTAL CODE * | 22030 |

BILLING ADDRESS

☐ USE THE SAME INFORMATION FOR BILLING?

| | |
|---|---|
| COUNTRY * | |
| ADDRESS * | |
| ADDRESS LINE 2 | |
| CITY/TOWN * | |
| STATE/PROVINCE/REGION * | |
| ZIP/POSTAL CODE * | |

BILLING INFORMATION

| | | |
|---|---|---|
| CREDIT CARD TYPE * | ●●●●●●●● | ACCEPTED CARDS |
| CREDIT CARD NUMBER * | ●●●●●●●● | VISA, MASTER CARD AND AMERICAN EXPRESS |
| CVV * | ●●●●●●●●  WHAT'S THIS? | WHEN WILL I BE CHARGED? |
| EXPIRATION DATE * | ●●●●●●●● | YOUR CREDIT CARD WILL BE CHARGED $5 WHEN YOU COMPLETE THIS ORDER. |
| CARDHOLDER'S NAME * | ●●●●●●●● | AFTER THAT, IT WILL BE CHARGED WHEN YOU ACCUMULATE |
| PROMO CODE | ●●●●●●●●  APPLY PROMO CODE | CERTAIN THRESHOLDS OF SPEND ON YOUR CAMPAIGN, AND AGAIN AT THE END OF EACH MONTH TO CLEAR YOUR BALANCE. PLEASE VISIT OUR HELP PAGE FOR DETAILS ABOUT BILLING |

TERMS AND CONDITIONS

☐ I ACCEPT THESE TERMS AND CONDITIONS AND PRIVACY POLICY.
☐ I AUTHORIZE YOU TO SEND ME OCCASSIONAL EMAIL UPDATES ON NEW FEATURES OF THIS SERVICE AND OTHER RELATED OFFERS.
☐ I AUTHORIZE YOU TO CHARGE ONE-TIME FEE OF $5 TO CREATE MY ACCOUNT. I UNDERSTAND THAT THIS AMOUNT IS NON-REFUNDABLE.

[ NEXT ]

FIG. 16

SET UP CAMPAIGN | TARGET + BID | SET BUDGET | ADD BANNERS | CREATE ACCOUNT | REVIEW + LAUNCH

REVIEW AND LAUNCH

REVIEW CAMPAIGN
PLEASE REVIEW ALL OF THE INFORMATION ON THIS PAGE. ONCE YOU ARE READY TO LAUNCH YOUR CAMPAIGN, PLEASE CLICK THE "COMPLETE PURCHASE" BUTTON.

PATENT CAMPAIGN EDIT

TARGETING AND BIDDING DETAILS
| GEOGRAPHY | UNITED STATES | EDIT |
| TYPES OF SITES | NEWS | EDIT |
| AUDIENCE | ALL AUDIENCES | EDIT |

BUDGET DETAILS
| CAMPAIGN TYPE | CPC | EDIT |
| YOUR MAXIMUM BID | $0.75 | EDIT |
| YOUR DAILY BUDGET | $10/DAY | EDIT |

BANNERS
| BANNER NAME | DIMENSIONS | FILE SIZE | CLICK-THROUGH URL |
|---|---|---|---|
| NVG BANNER | 728X90 | 46KB | HTTP://WWW.NVG-INC.COM |

[COMPLETE PURCHASE]

DID YOU KNOW?
ONCE YOU CLICK "COMPLETE PURCHASE", YOUR CAMPAIGN WILL BE REVIEWED BY OUR NETWORK QUALITY TEAM WITHIN 2 BUSINESS DAYS.

IF IT MEETS OUR BUSINESS AND BANNER GUIDELINES, YOUR CAMPAIGN WILL BE ACTIVATED AND YOUR BANNERS WILL START SHOWING ON OUR NETWORK. YOU WILL RECEIVE AN EMAIL FROM US ONCE THE CAMPAIGN HAS BEEN REVIEWED.

SYSTEMS AND METHODS FOR ADMINISTERING AN ONLINE ADVERTISER BIDDING INTERFACE

CROSS-REFERENCE TO RELATED APPLICATIONS

This application is a continuation of and claims the benefit of priority to pending U.S. patent application Ser. No. 12/565,187, filed Sep. 23, 2009, which claims the benefit of U.S. patent application Ser. No. 61/099,483, filed on Sep. 23, 2008, all of which are incorporated herein by reference in their entireties.

TECHNICAL FIELD

The embodiments of the present disclosure relate generally to online advertising. More specifically, the exemplary embodiments described herein relate to systems and methods for administering an online advertiser bidding interface, by which an advertiser may bid on online advertising inventory of an online publisher.

BACKGROUND

As greater numbers of people use the World Wide Web for communication, commerce, and other daily activities, they generate larger and larger volumes of traffic over the Internet. Because the benefits of commercializing the Internet can be tremendous, businesses increasingly take advantage of this traffic by advertising their products or services online. These advertisements may appear in the form of leased advertising space (e.g., "banners") on content websites, which are operated by "publishers" who control the website content, and the availability and cost of the advertising space or "ad inventory."

Advertisers of various products or services may create online advertising campaigns that include advertisements designed to be placed on content websites during a specified period of time. For example, an automobile company may design several advertisements for a new model and may wish to have the advertisements placed online during a period surrounding the launch of the new model. Each time one of the advertisements is shown to a viewer of the website is known as an "impression." When shown the advertisement, the user may select, or "click," on the advertisement or may take another "action" such as completing an online form to request more information. If the user later purchases the new model of automobile, the purchase is referred to as a "conversion" of the impression. Advertisers may pay owners of content Web sites (i.e., the publishers) based on, for example, the number of impressions, clicks, or conversions over the course of an advertising campaign.

In some cases, an advertiser may have a marketing plan that identifies certain types of people as being target audience members for a given product or service. For example, the advertiser may wish to spend money only on users having certain demographics or personal interests. In addition, a company may want to determine a bid price, which represents the highest price that the company is willing to pay for placing an advertisement on a particular website, or displaying to a particular Internet user. The determination of a bid price may help companies, and those obtaining advertising space on their behalf, to assess the potential benefit of placing a particular advertisement on a particular web page at a particular time, etc.

Traditionally, companies would pay per impression, per click, and/or per conversion, regardless of whether or not the action for which they are paying (e.g., impressions, clicks, etc.) is the action that benefits them. Advertisers were able to provide particular designs for banner ads (i.e., "creatives") to third party advertising networks, for display on publishers' web sites. However, the advertisers were not able to control which sites within the network the creatives were displayed upon. Moreover, the advertisers were not able to control which groups of people were shown their creatives. For example, advertisers could not select specific demographic or behavioral characteristics of people desired to be shown the advertisers' creatives. As a result, advertisers were forced to pay for ad delivery to suboptimal populations of web users, publishers were unable to maximize the value of their web inventory, and third party networks were unable to fully leverage the relationships between advertiser interests and publisher assets.

Therefore, advertisers may wish to obtain very specific information about the types of consumers viewing various types of web sites and responding to their advertisements. In some cases, advertisers may be willing to spend more money per impression, click, or conversion for delivery to those consumers having desired demographics or personal interests. As a result, publishers of content websites and/or facilitators of third party advertising networks may wish to obtain as much information as possible about consumers and other users traveling between web pages associated with an advertising network.

The present disclosure is directed to solving one or more of the above-referenced problems by administering an online advertiser bidding interface.

SUMMARY

In accordance with one disclosed exemplary embodiment, a computer-implemented method is provided for administering an online advertiser bidding interface. The method includes providing a bidding interface to an advertiser through a web server, by which an advertiser may bid on online advertising inventory of an online publisher, the bidding interface displaying a plurality of targeting elements; receiving targeting information from the advertiser through the targeting elements of the bidding interface and the web server; and generating an advertising bid based on the received targeting information.

In accordance with another exemplary embodiment, a system is provided for administering an online advertiser bidding interface. The system includes a web server configured to: provide a bidding interface to an advertiser, by which an advertiser may bid on online advertising inventory of an online publisher, the bidding interface displaying a plurality of targeting elements; and receive targeting information from the advertiser through the targeting elements of the bidding interface.

In accordance with another exemplary embodiment, a computer-readable storage medium is provided for storing a computer program which, when executed by a computer, causes the computer to perform a method of administering an online advertiser bidding interface. The method includes providing a bidding interface to an advertiser through a web server, by which an advertiser may bid on online advertising inventory of an online publisher, the bidding interface displaying a plurality of targeting elements; receiving targeting information from the advertiser through the targeting elements of the bidding interface and the web server; and generating an advertising bid based on the received targeting information.

BRIEF DESCRIPTION OF THE DRAWINGS

FIG. 5 depicts a screenshot of an exemplary targeting and bidding page of a bidding interface consistent with embodiments of the present disclosure;

FIG. 6 depicts a screenshot of an exemplary geographic targeting and bidding page of a bidding interface consistent with embodiments of the present disclosure;

FIG. 7 depicts a screenshot of another exemplary geographic targeting and bidding page of a bidding interface consistent with embodiments of the present disclosure;

FIG. 8 depicts a screenshot of an exemplary subject matter targeting and bidding page of a bidding interface consistent with embodiments of the present disclosure;

FIG. 9 depicts a screenshot of an exemplary site targeting and bidding page of a bidding interface consistent with embodiments of the present disclosure;

FIG. 10 depicts a screenshot of an exemplary demographic targeting and bidding page of a bidding interface consistent with embodiments of the present disclosure;

FIG. 11 depicts a screenshot of an exemplary user interest targeting and bidding page of a bidding interface consistent with embodiments of the present disclosure;

FIG. 12 depicts a screenshot of an exemplary budget setting page of a bidding interface consistent with embodiments of the present disclosure;

FIG. 13 depicts a screenshot of an exemplary banner adding page of a bidding interface consistent with embodiments of the present disclosure;

FIG. 15 depicts a screenshot of an exemplary third-party banner selecting page of a bidding interface consistent with embodiments of the present disclosure;

FIG. 16 depicts a screenshot of an exemplary account creation page of a bidding interface consistent with embodiments of the present disclosure;

FIG. 17 depicts a screenshot of an exemplary review and launch page of a bidding interface consistent with embodiments of the present disclosure; and FIG. 18 depicts a screenshot of an exemplary performance tracking page of a bidding interface consistent with embodiments of the present disclosure.

DETAILED DESCRIPTION OF THE DRAWINGS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
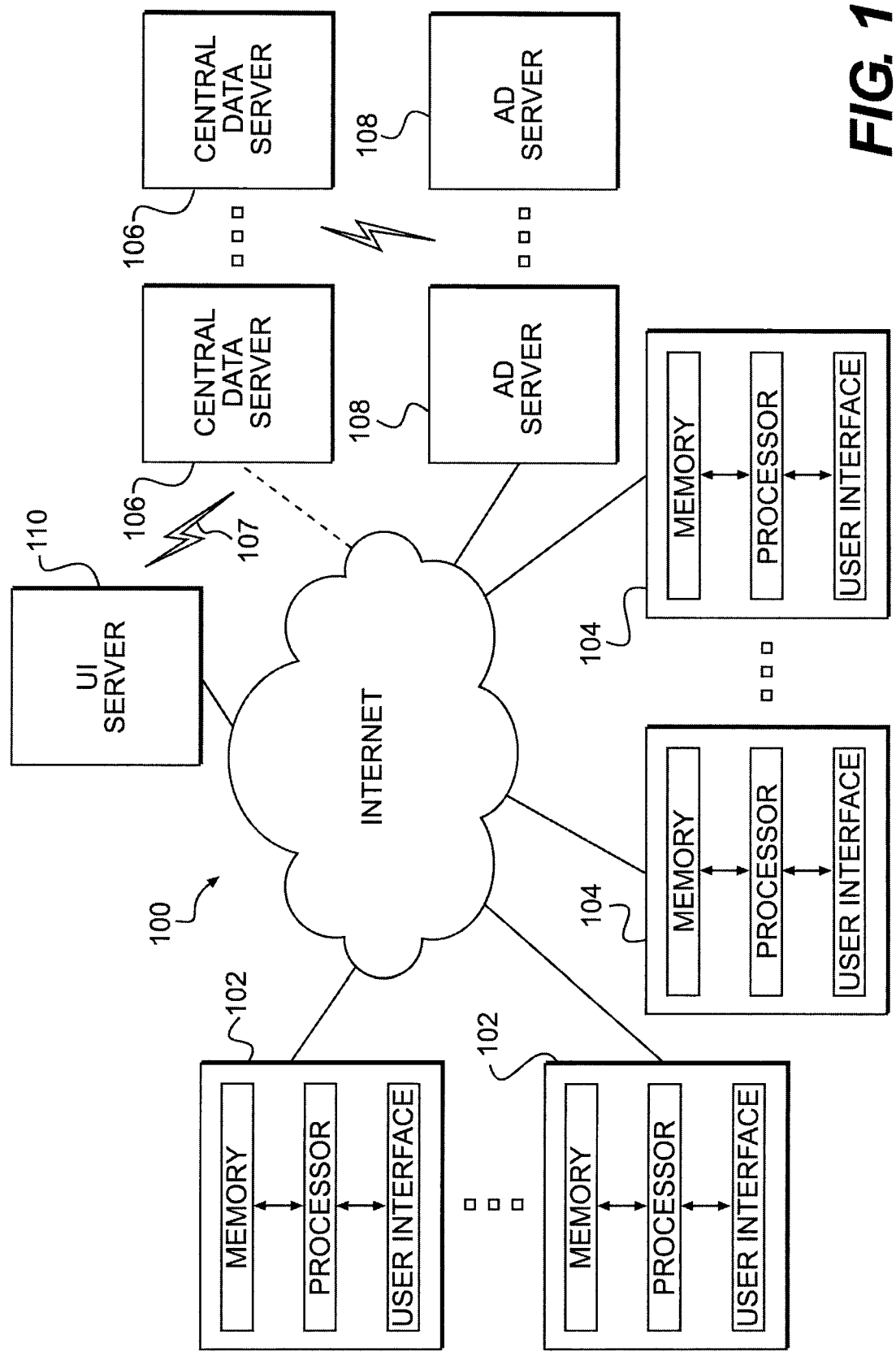
FIG. 1 depicts a block diagram of an exemplary system for administering an online advertiser bidding interface consistent with embodiments of the present disclosure.

FIG. 1 illustrates an exemplary system 100 for administering an online advertiser bidding interface. System 100 may include a plurality of advertisers 102, publishers 104, central data servers 106, ad servers 108, and a user interface ("UI") server 110, all disposed in communication with the Internet. As will be described in more detail below, in general, system 100 may be configured to create and administer an online advertiser bidding interface, by which advertisers 102 may bid on online ad inventory made available by publishers 104.

Advertisers 102 may include any entities having online advertisements (e.g., banner ads, pop-ups, etc.) desired to be delivered to online users. For example, advertisers 102 may have created advertisements relating to products or services marketable to one or more online users. Advertisers 102 may interact with publishers 104, central data servers 106, ad servers 108, and/or UI server 110 through computers connected to the Internet. As shown in FIG. 1, each advertiser 102 may interact with system 100 through a computer comprising, for example, a memory, processor, and user interface. Thus, advertisers 102 may be able to communicate advertising campaign information, such as ad information, targeting information, consumer information, budget information, bidding information, etc., to other entities in system 100.

Publishers 104 may include any entities having inventories of available online advertising space. For example, publishers 104 may include online content providers, search engines, e-mail programs, or any other online site or program having online user traffic. Publishers 104 may interact with advertisers 102, central data servers 106, ad servers 108, and/or UI server 110 via computers connected to the Internet. As shown in FIG. 1, each publisher 104 may interact with system 100 through a computer comprising, for example, a memory, processor, and user interface. Thus, publishers 104 may be able to communicate inventory information, such as banner space information, site information, demographic information, cost information, etc., to other entities in system 100.

User interface (UI) server 110 may be any type of server configured to generate and display a bidding interface to online advertisers 102. For example, UI server 110 may operate any desired web server software configured to deliver a particular web interface to advertisers 102. UI server 110 may comprise a plurality of servers, each configured to receive URL requests and information from advertisers 102, and deliver web pages to advertisers 102 in response to the requests. In one embodiment, UI server 110 may be configured to provide an interface through which advertisers 102 may send advertising and targeting information to an administrator and bid on online advertising inventory provided by publishers 104. In one embodiment, the bidding interface may be a graphical user interface ("GUI") having a plurality of UI elements, or "targeting elements," by which an advertiser may select and communicate advertising and targeting information to an administrator.

Central data servers 106 may include any types of servers configured to receive campaign advertising and targeting information from advertisers 102 through UI server 110, aggregate such information for a plurality of advertising campaigns, process campaign bidding information, and generate advertiser bids based on information submitted through UI server 110. Central data servers 106 may also be configured to send the generated advertiser bids to ad servers 108. In one embodiment, central data servers 106 may be disposed in communication with the Internet through a firewall. Alternatively, or additionally, central data servers 106 may be disposed in direct communication with UI server 110 through a communication channel 107, such as a wired or wireless connection or network.

Ad servers 108 may include any types of servers configured to process advertising and targeting information from advertisers 102 and/or site information from publishers 104, either directly or indirectly. In certain embodiments, ad servers 108 may be remote web servers that receive advertising information from advertisers 102 through UI server 110 and/or central data servers 106, and serve ads to be placed by publishers 104. Ad servers 108 may be configured to serve ads across various domains of publishers 104, for example, based on advertising and targeting information provided by advertisers 102. Ad servers 108 may also be configured to serve ads based on contextual targeting of web sites, search results, and/or user profile information. Ad servers 108 may be configured to generate delivery performance information in the form of, for example, behavioral logs, leadback logs, click logs, action logs, and impression logs, based on users' interactions with web sites and ads implemented by system 100. In one embodiment, UI server 110, central data servers 106, and ad servers 108 may be operated by one or more third-party ad networks or "administrators."

Figure 2:
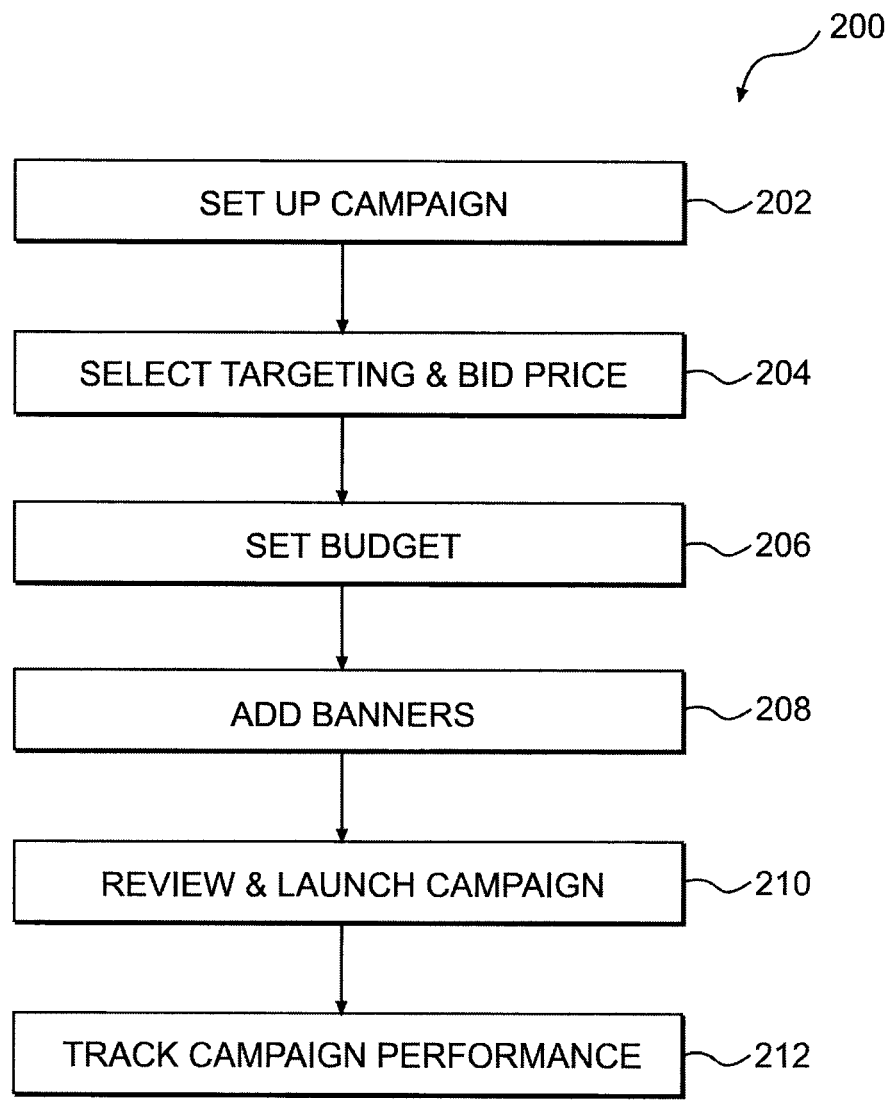
FIG. 2 depicts a flow chart of an exemplary method for initiating an online advertising campaign through a bidding interface consistent with embodiments of the present disclosure.
Figure 4:
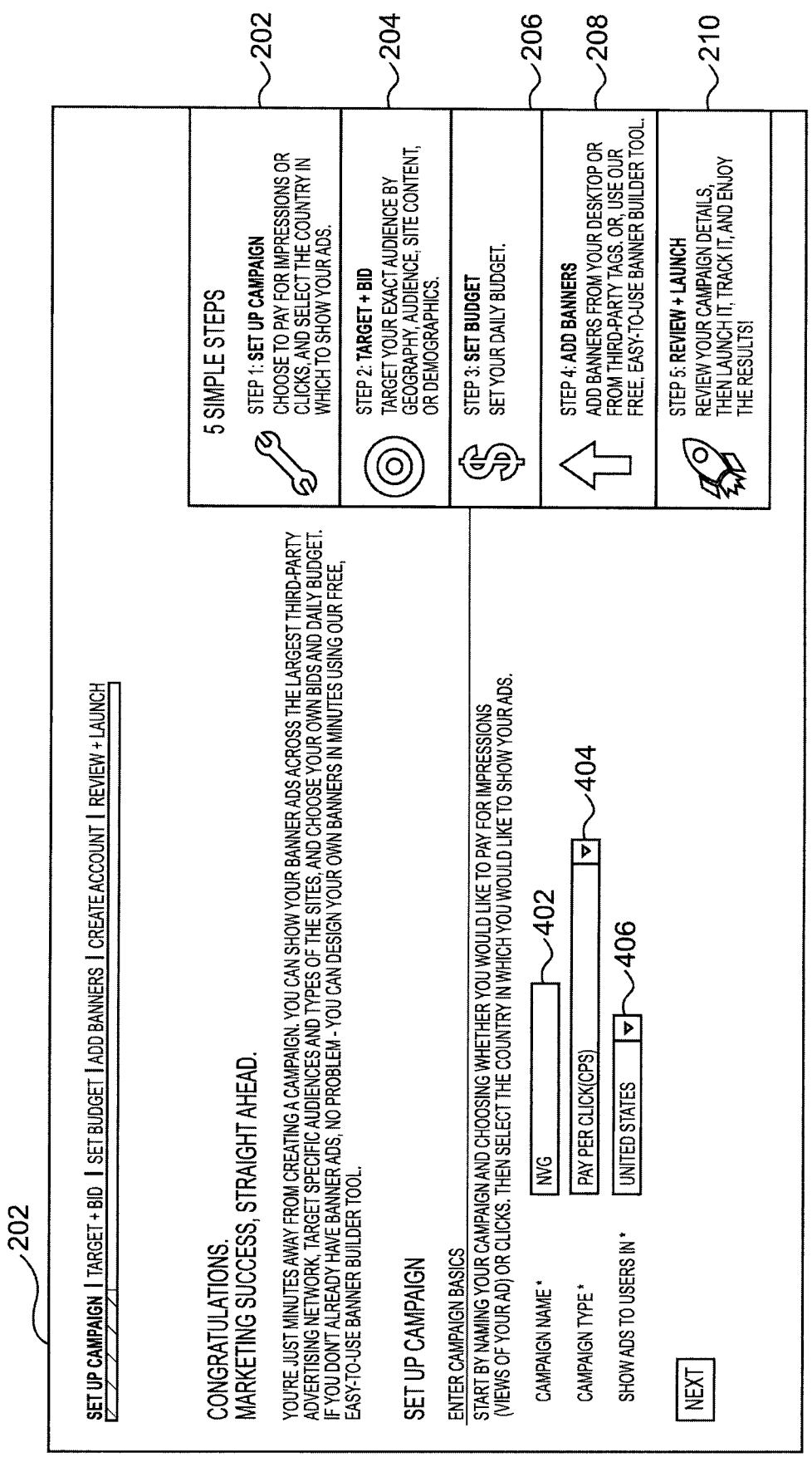
FIG. 4 depicts a screenshot of an exemplary introductory page of a bidding interface consistent with embodiments of the present disclosure.

FIG. 2 depicts an exemplary method 200, by which an advertiser may initiate an online advertising campaign through a bidding interface operated by an administrator. Specifically, advertisers may perform method 200 by requesting an instance of an advertiser bidding interface from UI server 110. Advertisers may then use method 200 to set up a campaign (step 202), select targeting and bid price (step 204), set a budget (step 206), add banners (208), review and launch the campaign (step 210), and track campaign performance (step 212). FIG. 4 depicts an exemplary screenshot of an advertiser bidding interface that can be sent by UI server 110 and received by an advertiser. In particular, FIG. 4 depicts how an advertiser may perform five (5) exemplary steps of method 200 to initiate an online advertising campaign through a bidding interface, as described in more detail with respect to FIGS. 4-18.

Figure 3:
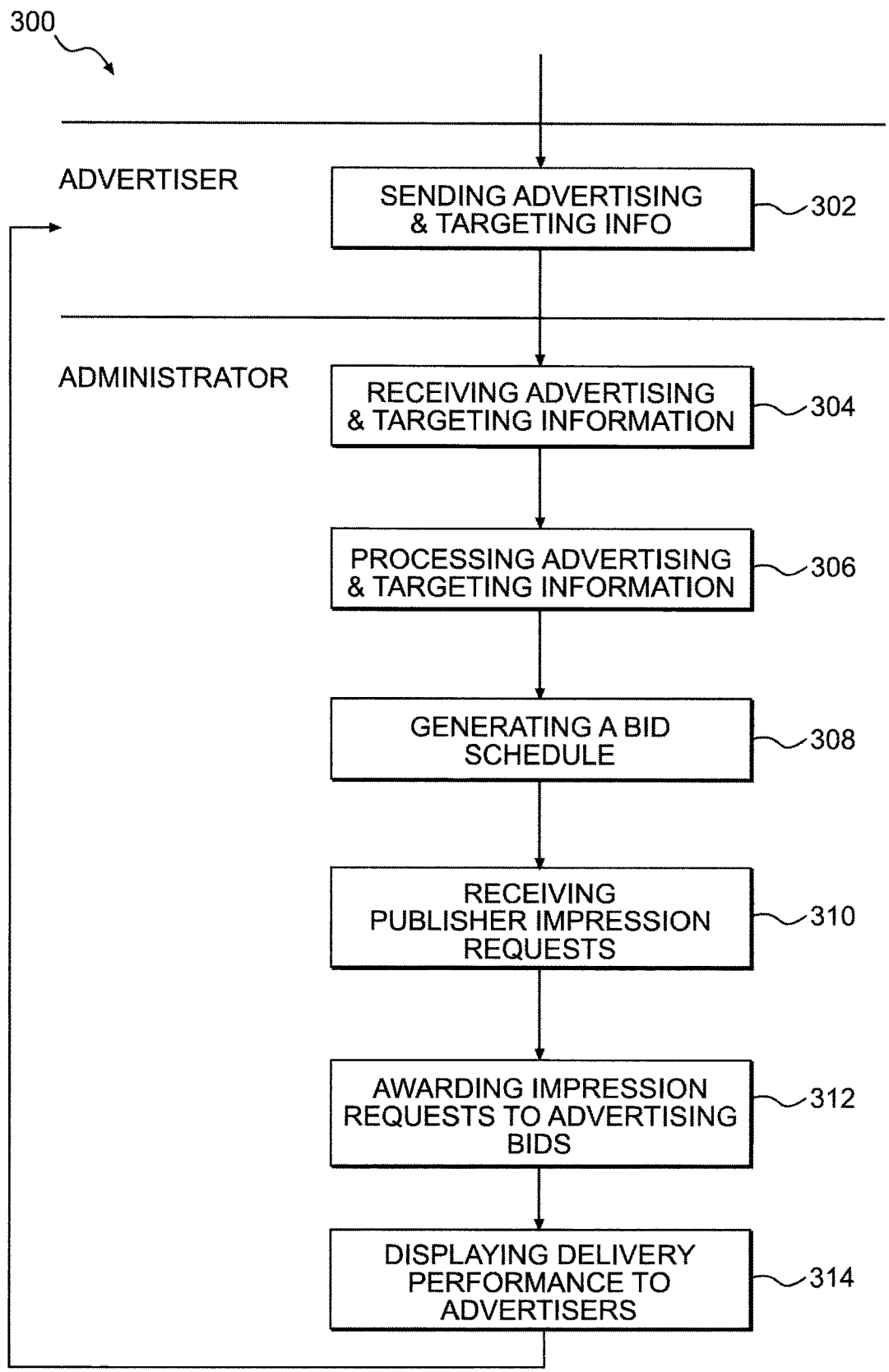
FIG. 3 depicts a flow chart of an exemplary method for administering an online advertising campaign based on advertiser interaction with a bidding interface consistent with embodiments of the present disclosure.

FIG. 3 depicts a flow chart of an exemplary method 300 for administering an online advertising campaign based on advertiser interaction with a bidding interface consistent with embodiments of the present disclosure. Method 300 may include an advertiser sending advertising and targeting information to an administrator (step 302). For example, an advertiser may send advertising and targeting information to an administrator through a bidding interface provided through UI server 110, by performing method 200 for initiating an online advertising campaign. In one embodiment, the advertising and targeting information may include, for example, at least one of a bid price, a geographic constraint, a site type constraint, an audience constraint, and/or a timing constraint, along with one or more ad banners, budget information, and/or account information. Method 300 may further include an administrator receiving the advertising and targeting information (step 304). For example, the administrator may receive the advertising and targeting information from an advertiser interacting with a bidding interface provided through UI server 110. Method 300 may further include processing the advertising and targeting information (step 306). In one embodiment, the administrator may pass the advertising and targeting information received through UI server 110 to central data servers 106. For example, the administrator may use any type of extensible markup language ("XML") associated with the bidding interface provided through UI server 110 to encode and push information to central data servers 106. The administrator may also or alternatively use a web application programming interface ("web API") to process the information and/or convert it to any format desired before pushing the information to central data servers 106. Central data servers 106 may receive and aggregate the advertising and targeting information received through the UI server 110 for any number of advertisers. Central data servers 106 may also receive advertising and targeting information, or any other ad campaign information, through any other interface or source. Central data servers 106 may therefore aggregate any advertising and targeting information for any number or type of advertising campaigns.

Method 300 of FIG. 3 may also include generating a bid schedule (step 308). For example, central data servers 106 may generate any number of advertising bids for each campaign initiated by an advertiser, based on advertising and targeting information provided by the advertiser. In one embodiment, each advertising bid may include a bid price, a geographic constraint, a site type constraint, an audience constraint, and/or a timing constraint. The method may also include receiving publisher impression requests from publishers (step 310). For example, each time an Internet user requests a web page having banner inventory from a publisher, the publisher may send an impression request to the administrator. The administrator may therefore compile bids generated based on advertiser-provided information, and impression requests based on publisher-provided information.

Method 300 of FIG. 3 may further include awarding impression requests to advertising bids based on the publisher-provided information and at least one of a bid price, a geographic constraint, a site type constraint, an audience constraint, and/or a timing constraint, as received from advertisers through the bidding interface (step 312). For example, in one embodiment, each time the administrator receives an impression request from a publisher, the administrator may filter out any bid requests that do not have their geographic constraints, site type constraints, audience constraints, and timing constraints satisfied by the impression request, thereby leaving a list of qualifying advertising bids. The administrator may then place the qualifying advertising bids in a bid table in a sequence based on the bid price associated with each advertising bid. The administrator may then award the impression request to the qualifying advertising bid having the highest bid price. The administrator may perform this method of awarding impression requests to advertising bids such that various geographical, site type, audience, and time constraints are satisfied, and that the qualifying advertising bids with the highest bid prices are awarded the impression requests. In some embodiments, the administrator may also employ various control methods, such as using bid allocation values and/or algorithms, to achieve desired timing and site spreading constraints, which result in awarding a qualifying advertising bid that does not have the highest bid price.

Method 300 of FIG. 3 may also include displaying delivery performance information to advertisers based on the results of the process of awarding impression requests (step 314). For example, the administrator may display the performance of an advertiser's online advertising campaign to the advertiser through the bidding interface delivered through UI server 110. In one embodiment, the administrator may display performance information including: the time period of the campaign, the total impressions, the total clicks, the total conversions, the total spend, the click-through rate (CTR), the conversion rate (CVR), the effective cost per action (eCPA), and/or the effective cost per click (eCPC). The administrator may also display such information graphically, such as the number of clicks, impressions, and/or conversions logged over time, for a given time period.

As described above, FIG. 4 depicts a screenshot of an exemplary introductory page of a web-based advertiser bidding interface that can be provided through UI server 110 and displayed to an advertiser 102 over the Internet. Exemplary embodiments of the pages associated with an advertiser bidding interface will now be described in detail with reference to FIGS. 4-18. As shown in FIG. 4, an advertiser may set up a campaign by entering a campaign name in UI element 402. An advertiser may select the type of advertising campaign using UI element 404, which in one embodiment may be a drop-down menu including the options of paying per thousand impressions (CPM) or paying per click (CPS). An advertiser may also choose to show ads to users in particular countries using UI element 406. As shown in FIG. 4, an advertiser may then perform the steps of setting up a campaign (step 202), selecting targeting and bid price (step 204), setting a budget (step 206), adding banners (208), and reviewing and launching the campaign (step 210).

FIG. 5 depicts a screenshot of an exemplary targeting and bidding page of the bidding interface, by which an advertiser may selectively target by geography using UI elements 502, target by type of site using UI elements 504, target by audience using UI elements 506, and/or set a maximum bid using UI element 512 (step 204). In one embodiment, an advertiser may manipulate one or more of UI elements 502, 504, 506, and 512 to selectively create targeting and bidding information to be sent to the administrator through UI server 110. As shown in FIG. 5, the administrator may send impression and bidding information to the advertiser in the form of the available daily impressions 514, a minimum bid 508, and/or a suggested bid 510. As an advertiser manipulates UI elements 502, 504, 506, and 512 to modify the targeting and bidding information, the displayed available daily impressions 514, minimum bid 508, and/or suggested bid 510 may be updated in real time to reflect those values associated with the targeting and bidding information input by the advertiser. For example, in one embodiment, as an advertiser reduces the geographical area, site type, and/or audience to which ads may be delivered, the number of available daily impressions 514 may decrease, and the minimum bid 508 and suggested bid 510 may increase. These dynamics may reflect the fact that as advertisers constrain the geography, site type, and audience type, the number of impression requests satisfying those constraints will naturally reduce, and that those impression requests should become more effective and valuable for the advertiser.

FIG. 6 depicts a screenshot of an exemplary geographic targeting and bidding page of a bidding interface that may be displayed to an advertiser through UI server 110. In particular, the targeting and bidding page may include a UI element 602, through which an advertiser may constrain ad delivery to one or more of the available states in an ad network. In addition, FIG. 7 depicts a screenshot of an exemplary geographic targeting and bidding page having a UI element 702, through which an advertiser may constrain ad delivery to one or more of the available cities in an ad network. Of course, geographical area may be divided, displayed, and selected based on any other category or segment of geography, such as region or municipality.

FIG. 8 depicts a screenshot of an exemplary subject matter targeting and bidding page of a bidding interface that may be displayed to an advertiser through UI server 110. In particular, the targeting and bidding page may include a UI element 802, through which an advertiser may constrain ad delivery to sites with particular types of subject matter or content. Similarly, FIG. 9 depicts a screenshot of an exemplary site targeting and bidding page including a UI element 902, through which an advertiser may constrain ad delivery to certain pre-determined sections of the ad network, based on specific sites or categories of sites in the network.

FIG. 10 depicts a screenshot of an exemplary demographic targeting and bidding page of a bidding interface that may be displayed to an advertiser through UI server 110. In particular, the targeting and bidding page may include a UI element 1002, through which an advertiser may constrain ad delivery to Internet users or "visitors" with specific demographic attributes, such as by gender, age, and/or socio-economic characteristics. Likewise, FIG. 11 depicts a screenshot of an exemplary user interest targeting and bidding page of a bidding interface having a UI element 1102, through which an advertiser may constrain ad delivery to visitors with specific subject matter interests.

Geographic, site type, and audience information for delivered ad impressions may be determined by the administrator through any desirable means, such as directly from publishers or Internet users, through contextual fetching and analysis of web pages, through cookie-obtained information, and/or from user information provided through registration with the ad network (e.g., for Internet and/or e-mail access). In addition, each of the geographic, site type, and audience categories discussed above and depicted in FIGS. 6-11 may be divided and/or further sub-divided by any alternative categories or types of categories, as desired.

FIG. 12 depicts a screenshot of an exemplary budget setting page of a bidding interface that may be displayed to an advertiser through UI server 110. As shown in FIG. 12, the budget setting page may include a UI element 1202, through which an advertiser may set a daily budget (step 206).

FIG. 13 depicts a screenshot of an exemplary banner adding page of a bidding interface that may be displayed to an advertiser through UI server 110. As shown in FIG. 13, an advertiser may manipulate the banner adding page to add banners that can be associated with the advertising bids of the campaign being initiated by the advertiser (step 208). In one embodiment, an advertiser may select between uploading a banner file using UI element 1302, building a banner using UI element 1304, and/or using a third-party tag using UI element 1306. In particular, an advertiser may use UI element 1302 to upload an image file for the banner from the advertiser's computer. The advertiser may also select the banner size, name the banner, and select a click-through URL using UI element 1310. The advertiser may upload and/or create any desired number of banners, which may be displayed as a list in UI element 1308. Thus, the advertiser may additionally or alternatively build additional banners using UI element 1304 and/or select third-party tags using UI element 1306.

Figure 14:
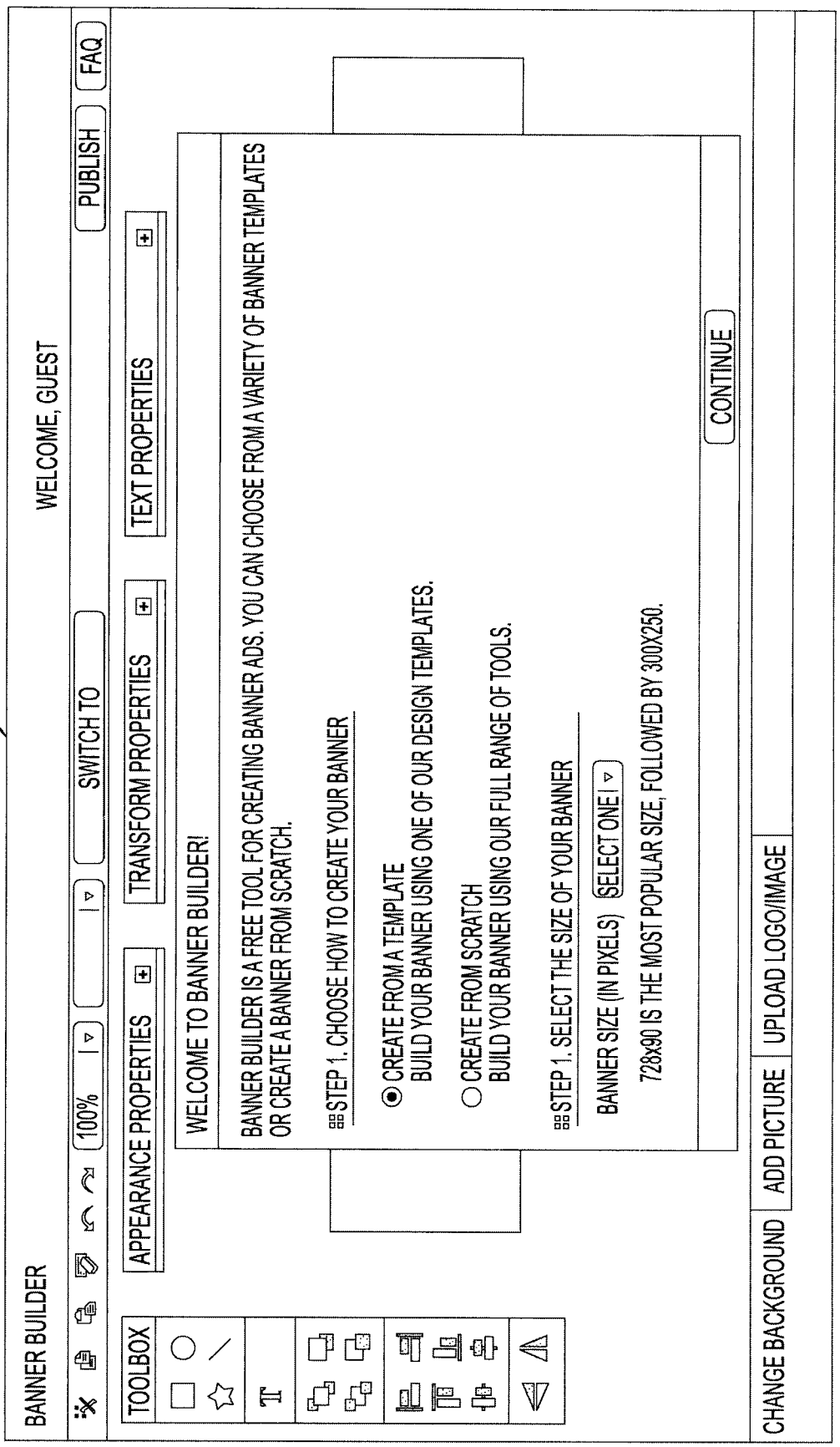
FIG. 14 depicts a screenshot of an exemplary banner building page of a bidding interface consistent with embodiments of the present disclosure.

FIG. 14 depicts a screenshot of an exemplary banner building page of a bidding interface that may be displayed to an advertiser through UI server 110. An advertiser may use the banner building page to either create a banner using a pre-loaded design template or create a banner from scratch. The banner building page may include any number of artwork-type UI elements desired for building a banner, including selecting a banner size, changing a background, adding and modifying graphics, pictures and logos, and adding and modifying text. The advertiser may also define a click-through URL for the banner created using the banner building page.

Figure 15:
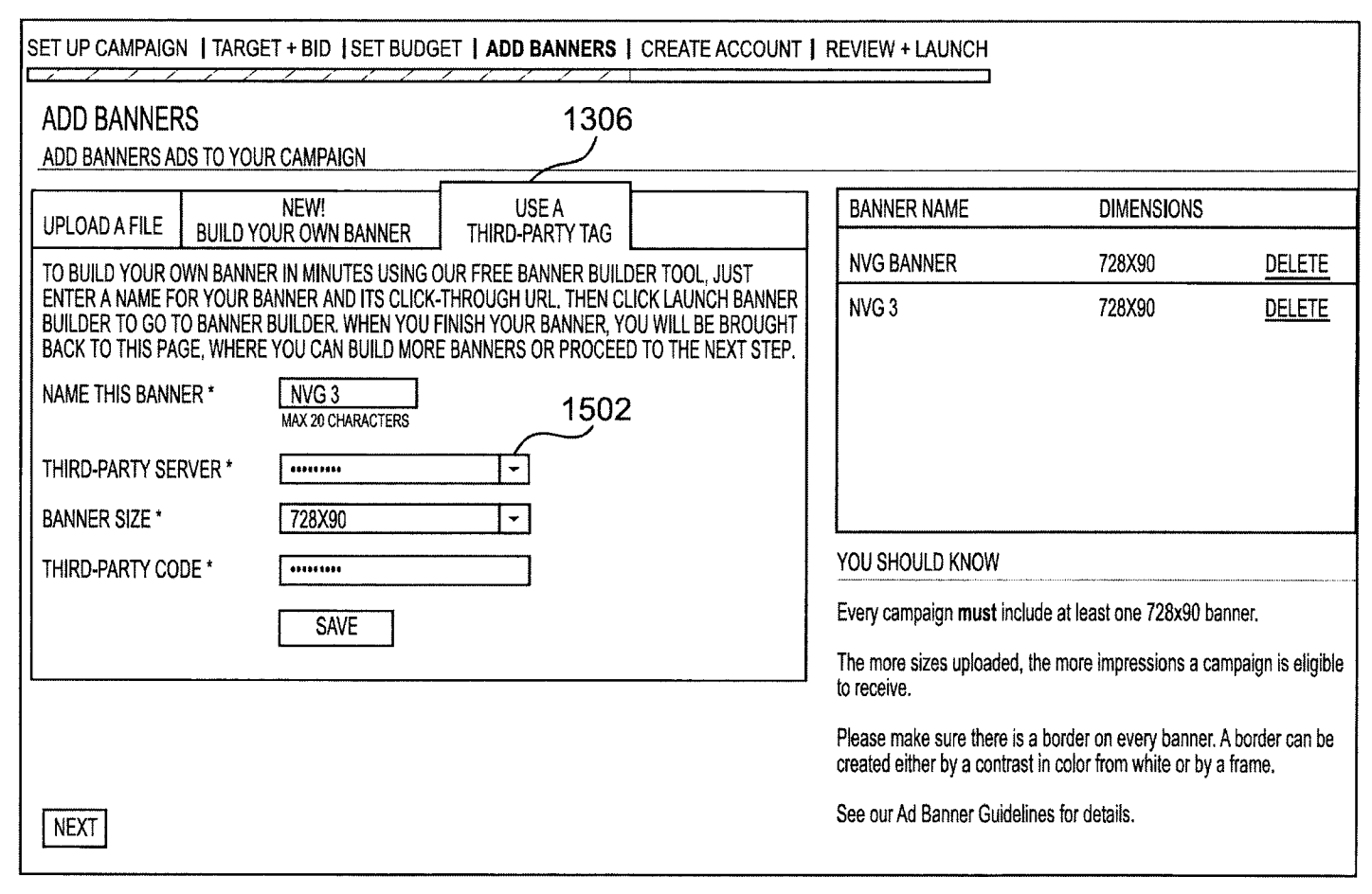

FIG. 15 depicts a screenshot of an exemplary third-party banner selecting page of a bidding interface that may be displayed to an advertiser through UI server 110. As shown in FIG. 15, an advertiser may name the banner, select a third-party ad server from UI element 1502, select a banner size, and/or enter a third-party code.

FIG. 16 depicts a screenshot of an exemplary account creation page of a bidding interface that may be displayed to an advertiser through UI server 110. As shown in FIG. 16, an advertiser may enter account information, personal information, and/or billing information, as desired. The advertiser may also accept or deny certain terms and conditions, as shown in FIG. 16.

FIG. 17 depicts a screenshot of an exemplary review and launch page of a bidding interface that may be displayed to an advertiser through UI server 110. In particular, the administrator may send and display to the advertiser the selected targeting and bidding details, the budget details, and/or the selected or created banners, which the advertiser may review and either edit, or confirm, to complete the purchase of targeted online advertising.

Figure 18:
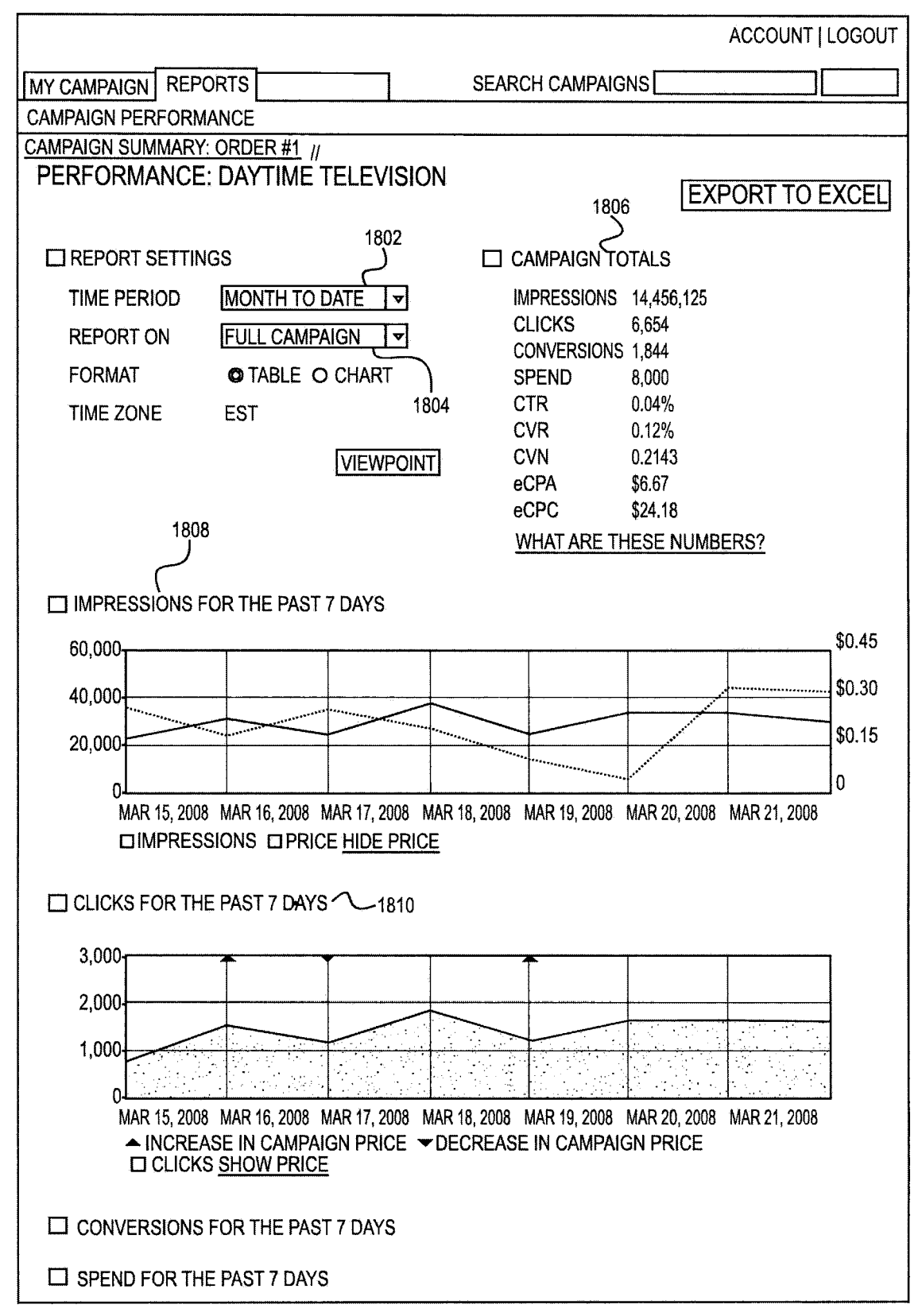

FIG. 18 depicts a screenshot of an exemplary performance tracking page of a bidding interface that may be displayed to an advertiser through UI server 110. In one embodiment, the administrator may display performance information including, the time period of the campaign, the total impressions, the total clicks, the total conversions, the total spend, the click-through rate (CTR), the conversion rate (CVR), the effective cost per action (eCPA), and/or the effective cost per click (eCPC). The administrator may also display such information graphically, such as the number of clicks, impressions, and/or conversions logged over time, for a given time period.

Accordingly, the present embodiments may advantageously provide scalable and flexible interfaces, systems, and methods for advertisers to selectively target and bid their advertising campaigns. The embodiments may also display segment level information about web populations of interest to advertisers and publishers, as well as provide web populations that may be specially targeted for advertising. Moreover, the presently disclosed systems and methods may be used for segment evaluation prior to an advertiser actually committing to purchasing a targeting product offered in the advertising network.

Specifically, advertisers may be provided with profile information for their customers, knowledge of how advertising affects different user segments, and knowledge of how sales can be improved through more effective advertising via user targeting. Moreover, various reports may be used to identify enterprise clients for custom insights and analytics, leveraging insights obtained from users across the network. Finally, users and/or user segments may be targeted and optimized based on profile information, thereby improving ad serving performance.

Therefore, companies may pay per impression, per click, and/or per conversion, only for those actions that benefit them, because advertisers may control which sites within the network the creatives are displayed upon, and which groups of people are shown their creatives. For example, advertisers may even select the specific demographic or behavioral characteristics of people desired to be shown the advertisers' creatives. As a result, advertisers may pay for ad delivery to desired populations of web users, publishers may maximize the value of their web inventory, and third party networks may fully leverage the relationships between advertiser interests and publisher assets.

The many features and advantages of the disclosure are apparent from the detailed specification, and thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for awarding impression requests for online inventory, the method comprising:
    causing to be displayed, over an Internet, an interactive bidding interface, at a plurality of advertiser computers through a web server, the interactive bidding interface configured to allow the plurality of advertiser computers to bid on online advertising inventory, the interactive bidding interface including a banner adding page configured to allow the plurality of advertiser computers to create a banner;
    receiving, by a data server processor, targeting information and a banner from each of the plurality of advertiser computers via one or more targeting elements of the interactive bidding interface, wherein the data server processor is in communication with the Internet through a firewall;
    generating, by the data server processor, a plurality of content bids based on the targeting information and the banner received from the plurality of advertising computers;
    receiving, over the Internet, by the data server processor, an impression request from a publisher processor, the impression request including one or more constraints including at least one of a geographic constraint, a site type constraint, an audience constraint, or a timing constraint;
    filtering the plurality of content bids to identify a subset of the plurality of content bids that satisfy the one or more constraints of the impression request;
    awarding the impression request to one of the plurality of advertiser computers based on a bid price associated with the subset of the plurality of content bids; and
    updating, based on real-time tracking of the awarded impression request, the interactive bidding interface to graphically display performance metrics.

2. The computer-implemented method of claim 1, further comprising:
    transmitting, over the Internet, to each of the plurality of advertiser computers, via the interactive bidding interface, minimum bid information and suggested bid information based on the targeting information received from the plurality of advertiser computers, wherein values displayed for the minimum bid information and the suggested bid information are configured to be updated in real time.

3. The computer-implemented method of claim 1, further comprising:
    encoding the targeting information received from the plurality of advertiser computers using at least one of XML or a web API associated with the interactive bidding interface.

4. The computer-implemented method of claim 1, further comprising:
- providing, by the data server processor, one or more of a budget setting page, an account creation page, and a review and launching page to the plurality of advertiser computers through the interactive bidding interface; and
- receiving, by the data server processor, one or more of a daily budget, account information, and a launch confirmation from at least one of the plurality of advertiser computers through the interactive bidding interface.

5. The computer-implemented method of claim 1, further comprising:
- causing to be displayed, at the plurality of advertiser computers, via the interactive bidding interface, delivery performance information based on one or more of a click-through rate (CTR), a conversion rate (CVR), an effective cost per action (eCPA), or an effective cost per click (eCPC).

6. The computer-implemented method of claim 1, further comprising:
- generating a bid table of the plurality of filtered content bids in a sequence based on a respective bid price associated with each of the plurality of filtered content bids.

7. The computer-implemented method of claim 1, wherein the audience constraint includes at least one of a gender, an age, or a socioeconomic characteristic associated with targeted web visitors, and wherein the geographic constraint includes at least one of a country, a state, a city, or a municipality.

8. The computer-implemented method of claim 1, wherein the site type constraint limits ad delivery to one or more sites associated with particular categories of content.

9. A computer-implemented method for awarding impression requests for online inventory, the method comprising:
- causing to be displayed, over an Internet, an interactive bidding interface, at a plurality of advertiser computers through a web server, the interactive bidding interface configured to allow the plurality of advertiser computers to bid on online advertising inventory, the interactive bidding interface including a banner adding page configured to allow the plurality of advertiser computers to create a banner;
- receiving, by a data server processor, targeting information and a banner from each of the plurality of advertiser computers via one or more targeting elements of the interactive bidding interface, wherein the data server processor is in communication with the Internet through a firewall;
- generating, by the data server processor, a plurality of content bids based on the targeting information and the banner received from the plurality of advertising computers;
- receiving, over the Internet, by the data server processor, an impression request from a publisher processor, the impression request including one or more constraints including at least one of a geographic constraint, a site type constraint, an audience constraint, or a timing constraint;
- filtering the plurality of content bids to identify a subset of the plurality of content bids that satisfy the one or more constraints of the impression request;
- awarding the impression request to one of the plurality of advertiser computers based on a bid price associated with the subset of the plurality of content bids; and
- updating, based on real-time tracking of the awarded impression request, the interactive bidding interface to graphically display performance metrics.

10. The system of claim 9, wherein the at least one processor is configured to perform further operations including:
- transmitting, over the Internet, to each of the plurality of advertiser computers, via the interactive bidding interface, minimum bid information and suggested bid information based on the targeting information received from the plurality of advertiser computers, wherein values displayed for the minimum bid information and the suggested bid information are configured to be updated in real time.

11. The system of claim 9, wherein the at least one processor is configured to perform further operations including:
- encoding the targeting information received from the plurality of advertiser computers using at least one of XML or a web API associated with the interactive bidding interface.

12. The system of claim 9, wherein the at least one processor is configured to perform further operations including:
- providing, by the data server processor, one or more of a budget setting page, an account creation page, and a review and launching page to the plurality of advertiser computers through the interactive bidding interface; and
- receiving, by the data server processor, one or more of a daily budget, account information, and a launch confirmation from at least one of the plurality of advertiser computers through the interactive bidding interface.

13. The system of claim 9, wherein the at least one processor is configured to perform further operations including:
- causing to be displayed, at the plurality of advertiser computers, via the interactive bidding interface, delivery performance information based on one or more of a click-through rate (CTR), a conversion rate (CVR), an effective cost per action (eCPA), or an effective cost per click (eCPC).

14. The system of claim 9, wherein the at least one processor is configured to perform further operations including:
- generating a bid table of the plurality of filtered content bids in a sequence based on a respective bid price associated with each of the plurality of filtered content bids.

15. The system of claim 9, wherein the audience constraint includes at least one of a gender, an age, or a socioeconomic characteristic associated with targeted web visitors, and wherein the geographic constraint includes at least one of a country, a state, a city, or a municipality.

16. A computer-implemented method for awarding impression requests for online inventory, the method comprising:
- causing to be displayed, over an Internet, an interactive bidding interface, at a plurality of advertiser computers through a web server, the interactive bidding interface configured to allow the plurality of advertiser computers to bid on online advertising inventory, the interactive bidding interface including a banner adding page configured to allow the plurality of advertiser computers to create a banner;
- receiving, by a data server processor, targeting information and a banner from each of the plurality of advertiser computers via one or more targeting elements of the interactive bidding interface, wherein the data server processor is in communication with the Internet through a firewall;

generating, by the data server processor, a plurality of content bids based on the targeting information and the banner received from the plurality of advertising computers;

receiving, over the Internet, by the data server processor, an impression request from a publisher processor, the impression request including one or more constraints including at least one of a geographic constraint, a site type constraint, an audience constraint, or a timing constraint;

filtering the plurality of content bids to identify a subset of the plurality of content bids that satisfy the one or more constraints of the impression request;

awarding the impression request to one of the plurality of advertiser computers based on a bid price associated with the subset of the plurality of content bids; and updating, based on real-time tracking of the awarded impression request, the interactive bidding interface to graphically display performance metrics.

17. The non-transitory computer-readable medium of claim 16, wherein the instructions cause the at least one processor to perform further operations including:

transmitting, over the Internet, to each of the plurality of advertiser computers, via the interactive bidding interface, minimum bid information and suggested bid information based on the targeting information received from the plurality of advertiser computers, wherein values displayed for the minimum bid information and the suggested bid information are configured to be updated in real time.

18. The non-transitory computer-readable medium of claim 16, wherein the instructions cause the at least one processor to perform further operations including:

encoding the targeting information received from the plurality of advertiser computers using at least one of XML or a web API associated with the interactive bidding interface.

19. The non-transitory computer-readable medium of claim 16, wherein the instructions cause the at least one processor to perform further operations including:

providing, by the data server processor, one or more of a budget setting page, an account creation page, and a review and launching page to the plurality of advertiser computers through the interactive bidding interface; and receiving, by the data server processor, one or more of a daily budget, account information, and a launch confirmation from at least one of the plurality of advertiser computers through the interactive bidding interface.

20. The non-transitory computer-readable medium of claim 16, wherein the instructions cause the at least one processor to perform further operations including:

causing to be displayed, at the plurality of advertiser computers, via the interactive bidding interface, delivery performance information based on one or more of a click-through rate (CTR), a conversion rate (CVR), an effective cost per action (eCPA), or an effective cost per click (eCPC).

* * * * *